(12) United States Patent
Chakraborty (10) Patent No.: US 12,127,288 B2
(45) Date of Patent: Oct. 22, 2024

(54) SELF-HEALING WIRELESS NETWORK USING A ROBOTIC ASSISTANT

(71) Applicant: Ruckus IP Holdings LLC, Claremont, NC (US)

(72) Inventor: Anindya Chakraborty, Fremont, CA (US)

(73) Assignee: Ruckus IP Holdings LLC, Claremont, NC (US)

(*) Notice: Subject to any disclaimer, the term of this patent is extended or adjusted under 35 U.S.C. 154(b) by 201 days.

(21) Appl. No.: 17/553,940

(22) Filed: Dec. 17, 2021

(65) Prior Publication Data

US 2022/0217803 A1 Jul. 7, 2022

Related U.S. Application Data

(60) Provisional application No. 63/134,682, filed on Jan. 7, 2021.

(51) Int. Cl.
| | |
|---|---|
| H04W 76/18 | (2018.01) |
| H04W 76/15 | (2018.01) |
| H04W 76/22 | (2018.01) |

(52) U.S. Cl.
CPC ........... *H04W 76/18* (2018.02); *H04W 76/15* (2018.02); *H04W 76/22* (2018.02)

(58) Field of Classification Search
None
See application file for complete search history.

(56) References Cited

U.S. PATENT DOCUMENTS

| | | | | |
|---|---|---|---|---|
| 7,151,884 B1 * | 12/2006 | Rayes | ................. | H04L 43/0811 |
| | | | | 370/254 |
| 11,240,474 B1 * | 2/2022 | Lemberger | ............ | H04W 48/18 |

(Continued)

FOREIGN PATENT DOCUMENTS

| | | | | | |
|---|---|---|---|---|---|
| CN | 106843001 A | * | 6/2017 | ............. | G05B 19/04 |
| CN | 110958559 A | * | 4/2020 | | |
| WO | 2016010563 A1 | | 1/2016 | | |

OTHER PUBLICATIONS

"Notification of Transmittal of the International Search Report and the Written Opinion of the International Searching Authority, or the Declaration for corresponding International Application No. PCT/US2021/063959, mailing date: May 30, 2022, (20 pages)".

(Continued)

*Primary Examiner* — The Hy Nguyen
(74) *Attorney, Agent, or Firm* — Steven Stupp (57) ABSTRACT

A portable electronic device that selectively performs a remedial action is described. During operation, the portable electronic device may measure wireless signals associated with communication with the second electronic device. Then, based at least in part on the measured wireless signals, the portable electronic device may diagnose a communication problem. Moreover, when the portable electronic device is able to correct the communication problem, the portable electronic device may automatically and selectively perform the remedial action based at least in part on the communication problem, where the remedial action corrects the communication problem. For example, the remedial action may include: re-establishing a connection between the second electronic device and a controller; changing one or more configuration parameters of the second electronic device; and/or upgrading software in the second electronic device. Otherwise, the portable electronic device may provide infor- (Continued)

mation specifying the measured wireless signals and/or the communication problem to a computer.

20 Claims, 5 Drawing Sheets

(56) References Cited

U.S. PATENT DOCUMENTS

| | | | |
|---|---|---|---|
| 2012/0147739 A1* | 6/2012 | Chueh | H04L 43/0811 |
| | | | 370/216 |
| 2013/0035793 A1* | 2/2013 | Neumann | G05D 1/0242 |
| | | | 901/1 |
| 2016/0073286 A1 | 3/2016 | Wang et al. | |
| 2016/0095005 A1 | 3/2016 | Khoury et al. | |
| 2016/0277901 A1* | 9/2016 | Mitchell | H04L 12/04 |
| 2017/0070380 A1* | 3/2017 | Bajpai | H04L 41/0631 |
| 2019/0171483 A1* | 6/2019 | Santhar | G06F 9/4881 |
| 2019/0324745 A1* | 10/2019 | Chandra | G06F 8/453 |
| 2019/0360835 A1* | 11/2019 | Gariepy | G05D 1/0027 |
| 2020/0107243 A1 | 4/2020 | Chen et al. | |
| 2021/0307103 A1* | 9/2021 | Koizumi | G06F 3/1203 |

OTHER PUBLICATIONS

"Invitation to Pay Additional Fees and Communication Relating to the Results of the Partial International Search, for corresponding Application No. PCT/US2021/063959, dated Apr. 5, 2022, 13 pages".

* cited by examiner

SELF-HEALING WIRELESS NETWORK USING A ROBOTIC ASSISTANT

CROSS REFERENCE TO RELATED APPLICATIONS

This application claims priority under 35 U.S.C. 119(e) to: U.S. Provisional Application Ser. No. 63/134,682, "Self-Healing Wireless Assistant Using a Robotic Assistant," filed on Jan. 7, 2021, by Anindya Chakraborty, the contents of which are herein incorporated by reference.

FIELD

The described embodiments relate to techniques for maintaining a wireless network using a remote, autonomous robotic assistant.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge associated with WLANs is in troubleshooting and correcting communication problems. Notably, a wireless service provider is often not at the same physical location as a customer. Consequently, when a customer has a communication problem (such as difficulty connecting to a WLAN), the wireless service provider may need to send a repair person to the customer's location. This repair process is often time-consuming and expensive, which is typically frustrating for the wireless service provider and their customers.

SUMMARY

A portable electronic device that selectively performs a remedial action is described. This portable electronic device may include: an interface circuit that communicates with a second electronic device in a wireless network and a computer; a processor; and a memory that stores program instructions, where, when executed by the processor, the program instructions cause the computer to perform operations. Notably, during operation, the portable electronic device measures wireless signals associated with communication with the second electronic device. Then, based at least in part on the measured wireless signals, the portable electronic device diagnoses a communication problem. Moreover, when the portable electronic device is able to correct the communication problem, the portable electronic device automatically and selectively performs the remedial action based at least in part on the communication problem, where the remedial action corrects the communication problem. Otherwise, the portable electronic device provides information specifying the measured wireless signals, the communication problem or both addressed to the computer.

For example, when the communication problem includes a loss of a connection between the second electronic device and a controller of the second electronic device, the remedial action may include: establishing a connection or an association with a distressed service set identifier (SSID) of the second electronic device; rebooting the second electronic device; and re-establishing the connection between the second electronic device and the controller.

Alternatively, when the communication problem includes a mismatch in a communication protocol used by the second electronic device, the remedial action may include changing one or more configuration parameters of the second electronic device.

In some embodiments, the remedial action may include upgrading software in the second electronic device.

Moreover, the wireless network may include a WLAN. This WLAN may be compatible with an IEEE 802.11 communication protocol.

Furthermore, diagnosing the communication problem may include emulating a third electronic device and communicating with the wireless network. For example, during the emulating, the portable electronic device may execute an operating system of the third electronic device using a virtual machine.

Additionally, the second electronic device may include: an access point, an Evolved Node B (eNodeB), or a base station.

In some embodiments, the wireless signals are measured continuously, periodically or as-needed. For example, the portable electronic device may periodically determine a map of radio-frequency performance in an environment by measuring the wireless signals.

Note that the portable electronic device may include: a drive unit configured to move the electronic device; and a sensor configured to provide sensor information about the environment that includes the electronic device. During operation, the portable electronic device may access a map of the environment. Then, the portable electronic device may autonomously navigate in the environment based at least in part on the sensor information and the map. For example, the portable electronic device may navigate to within wireless range of the second electronic device when a potential communication problem associated with the second electronic device is reported or when routine maintenance is performed in the environment. Alternatively or additionally, the portable electronic device may receive navigation instructions associated with the second electronic device, where the navigation instructions specify a route to a location of the second electronic device. In some embodiments, the portable electronic device may automatically navigate to a recharging station in the environment, and then may recharge one or more batteries in the portable electronic device.

Moreover, the portable electronic device may include a cellular telephone. When a potential communication problem occurs with the second electronic device, the portable electronic device may receive the program instructions associated with the computer, which are then executed by the processor.

Another embodiment provides the second electronic device.

Another embodiment provides the computer.

Another embodiment provides a computer-readable storage medium with program instructions for use with the portable electronic device, the second electronic device or the computer. When executed by the portable electronic device, the second electronic device or the computer, the program instructions cause the portable electronic device, the second electronic device or the computer to perform at least some of the aforementioned operations in one or more of the preceding embodiments.

Another embodiment provides a method, which may be performed by the portable electronic device, the second electronic device or the computer. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A portable electronic device that selectively performs a remedial action is described. During operation, the portable electronic device may measure wireless signals associated with communication with the second electronic device. Then, based at least in part on the measured wireless signals, the portable electronic device may diagnose a communication problem. Moreover, when the portable electronic device is able to correct the communication problem, the portable electronic device may automatically and selectively perform the remedial action based at least in part on the communication problem, where the remedial action corrects the communication problem. For example, the remedial action may include: re-establishing a connection between the second electronic device and a controller; changing one or more configuration parameters of the second electronic device; and/or upgrading software in the second electronic device. Otherwise, the portable electronic device may provide information specifying the measured wireless signals and/or the communication problem to a computer.

By correcting the communication problem or providing the information that can be used to correct the communication problem, these communication techniques may improve the communication performance of the wireless network. Moreover, the communication techniques may reduce or eliminate the need for a wireless service provider to send a repair person to the second electronic device. Consequently, the communication techniques may reduce the time and expense needed to maintain the wireless network, and may improve the customer experience when communicating with the second electronic device and the wireless network.

In the discussion that follows, electronic devices or components in a wireless network communicate packets in accordance with a wireless communication protocol, such as: a wireless communication protocol that is compatible with an IEEE 802.11 standard (which is sometimes referred to as from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node or a base station in the wireless network may communicate with a local or remoter located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

Figure 1:
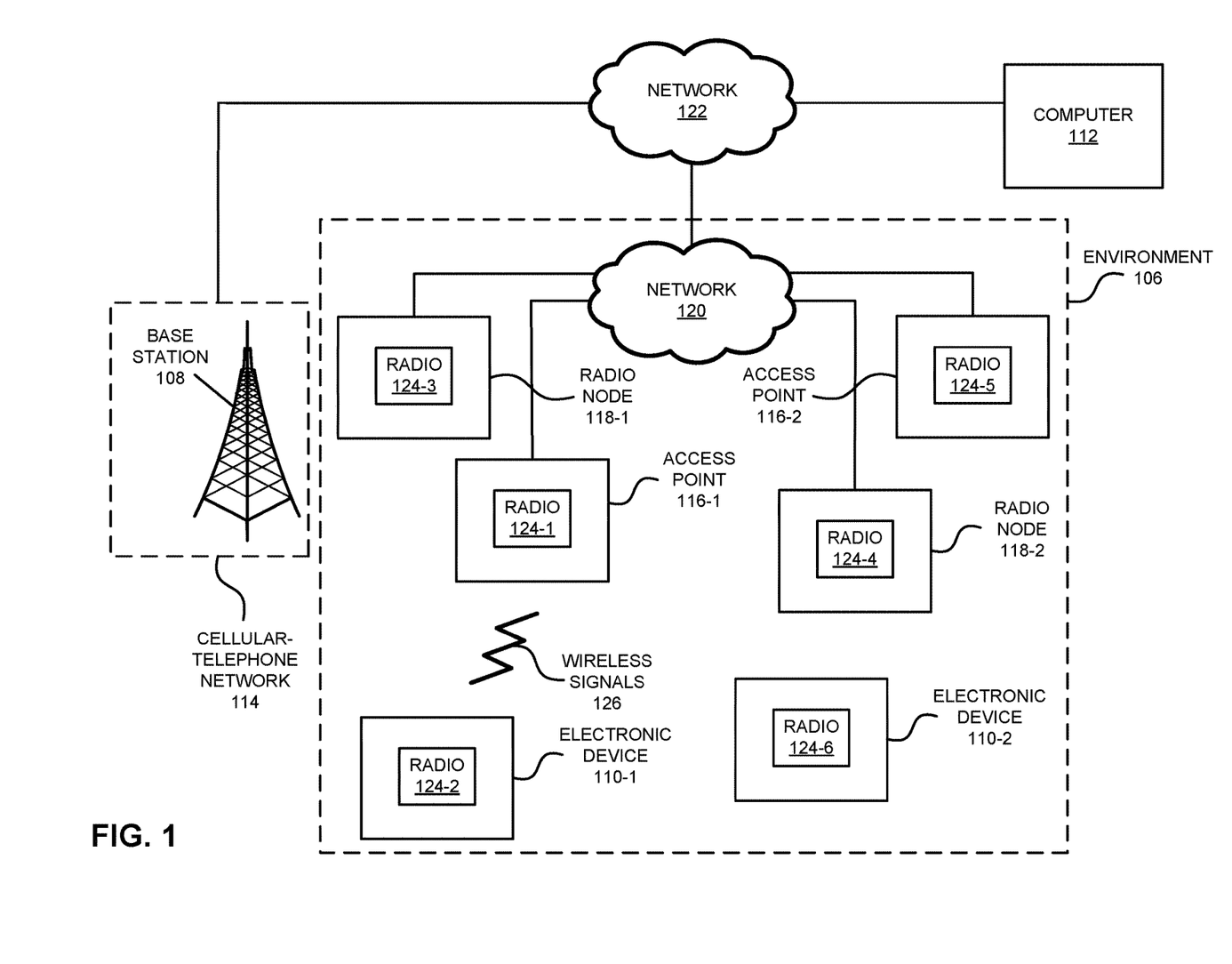
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a wireless local area network (WLAN), a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a cloud-based controller that manages and/or configures access points 116 and/or radio nodes 118, or that provides cloud-based storage and/or analytical services) using a wired communication protocol (such as Ethernet) via network 120 and/or 122. Note that networks 120 and 122 may be the same or different networks. For example, networks 120 and/or 122 may an intra-net or the Internet. In some embodiments, network 120 may include one or more routers and/or switches (not shown).

Figure 5:
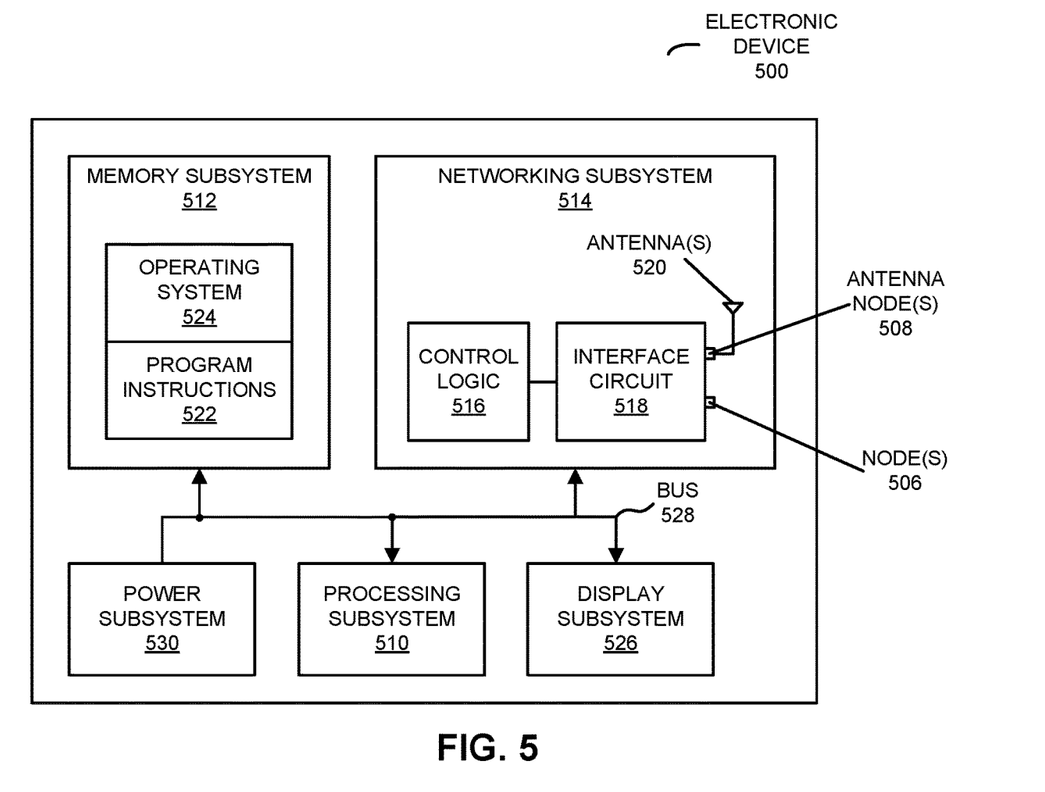
FIG. 5 is a block diagram illustrating an example of an electronic device in accordance with an embodiment of the present disclosure.

As described further below with reference to FIG. 5, electronic devices 110, computer 112, access points 116 and radio nodes 118 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or reseed rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In some embodiments, wireless communication between components in FIG. 1 uses one or more bands of frequencies, such as: 900 MHz, 2.4 GHz, 5 GHz, 6 GHz, 60 GHz, the CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While note shown in FIG. 1, in some embodiments there may be one or more routers or switches.

As discussed previously, maintaining a wireless network (such as a WLAN, a small cell or a cellular-telephone network) can be time-consuming and expensive. Notably, when a communication problem occurs, a repair person may need to be sent to a customer's location.

As described further below with reference to FIGS. 2-5, in order to address these problems a portable electronic device (such as electronic device 110-1) may selectively perform a remedial action. Notably, electronic device 110-1 may be used to perform scans of wireless signals 126 in environment 106. For example, the scans may be performed continuously, periodically (such as once per day) or as-needed (such as when a communication problem associated with an access point, a radio node or a base station occurs). Using scans, electronic device 110-1 may determine a map of radio-frequency performance in environment 106.

Moreover, when the communication problem occurs, electronic device 110-1 may be dispatched to or moved to within wireless range or proximity of an access point, a radio node or a base station (such as access point 116-1) that is suspected of being associated with the communication problem. For example, electronic device 110-1 may be transported to within wireless range of access point 116-1 by a repair person. Alternatively, electronic device 110-1 may be transported to within wireless range of access point 116-1 during routine maintenance in environment 106, such as by a maid that is cleaning a hotel room or when a guest checks out of a hotel.

In some embodiments, electronic device 110-1 may be capable of autonomously navigating to within wireless range of access point 116-1. Notably, electronic device 110-1 may be a robot with: a drive unit (such as a motor and wheels) that can move electronic device 110-1; and one or more sensors (such as an image sensor, radar, sonar, etc.) that provides sensor information about environment 106. Electronic device 110-1 may receive navigation instructions associated with access point 116-1, where the navigation instructions specify a route to a location of access point 116-1. Moreover, electronic device 110-1 may access or receive a map or a floor plan of environment 106 (such as a map that is stored in memory). Then, electronic device 110-1 may autonomously navigate in environment 106 based at least in part on the sensor information, the map and/or the navigation instructions. For example, the portable electronic device may navigate to within wireless range of access point 116-1 when a potential communication problem associated with access point 116-1 is reported or when routine maintenance is performed in environment 106. Alternatively or additionally, electronic device 110-1 may automatically navigate through environment 106 while periodically determining the map or radio-frequency performance. In some embodiments, electronic device 110-1 may automatically navigate to a recharging station in environment 106, and then may recharge one or more batteries in electronic device 110-1 (And, more generally, a power supply).

Once electronic device 110-1 is within wireless range of access point 116-1, radio 124-2 in electronic device 110-1 may measure wireless signals 126 associated with communication with access point 116-1. For example, wireless signals 126 may be transmitted by access point 116-1 or may be transmitted by another electronic device in FIG. 1 (such as electronic device 110-2).

Then, based at least in part on the measured wireless signals 126, electronic device 110-1 may diagnose a communication problem. For example, diagnosing the communication problem may include emulating another electronic device (such as electronic device 110-2) and communicating with a wireless network (such as a WLAN). For example, during the emulating, electronic device 110-1 may execute an operating system of electronic device 110-2 using a virtual machine. Note that a virtual machine may be executed by one or more cores in one or more processors. Moreover, a virtual machine may include an operating system or application environment that is implemented using software that imitates or emulates dedicated hardware or particular functionality of the dedicated hardware.

Furthermore, when electronic device 110-1 is able to correct the communication problem, electronic device 110-1 may automatically and selectively perform the remedial action based at least in part on the communication problem, where the remedial action corrects the communication problem. For example, when the communication problem includes a loss of a connection between access point 116-1 and computer 112, the remedial action may include: establishing a connection or an association with a distressed SSID of access point 116-1 (which access point 116-1 may provide when the connection with computer 112 is lost); rebooting access point 116-1 (e.g., by providing an instruction to access point 116-1 that causes it to reboot or power off and then back on); and re-establishing the connection between access point 116-1 and computer 112. Alternatively, when the communication problem includes a mismatch in a communication protocol used by access point 116-1 and e.g., electronic device 110-2, the remedial action may include changing one or more configuration parameters of access point 116-1. In some embodiments, the remedial action may include upgrading software in access point 116-1 (e.g., electronic device 110-1 may provide the software upgrade or may instruct access point 116-1 to download and install the software upgrade).

Otherwise (when electronic device 110-1 is unable to correct the communication problem), electronic device 110-1 may provide information specifying the measured wireless signals 126 and/or the communication problem to computer 112. Computer 112 may use the information to diagnose and/or correct the communication problem.

In some embodiments, instead of being a separate electronic device that determines the map of the radio-frequency performance and/or the selectively performs the remedial action, the portable electronic device may be one of the electronic devices (such as electronic device 110-1, e.g., a cellular telephone) that communicates with an access point, a radio node and/or a base station in FIG. 1. Then, when a communication problem with, e.g., access point 116-1 occurs, computer 112 may push (or electronic device 110-1 may request program instructions. When installed an executed by electronic device 110-1, the program instructions may cause electronic device 110-1 to perform at least some of the aforementioned operations, such as performing the scan, detecting the communication problem, and/or selectively performing the remedial action.

While the preceding examples illustrated the communication techniques being performed by electronic device 110-1, in other embodiments at least some of the embodiments in the communication techniques are performed in conjunction with or by computer 112 (e.g., instead of by electronic device 110-1).

In these ways, the communication techniques may help assess and maintain a wireless network (such as a WLAN, a small cell or a cellular-telephone network) in an automated manner. Notably, the portable electronic device that implements the communication technique may collect data (such as by performing the scan), may diagnose a communication problem, and may automatically and selectively perform a remedial action that corrects the diagnosed communication problem. Thus, the communication techniques may make it easier, cheaper and less time-consuming to address communication problems, which may improve the user experience when using the wireless network.

Figure 2:
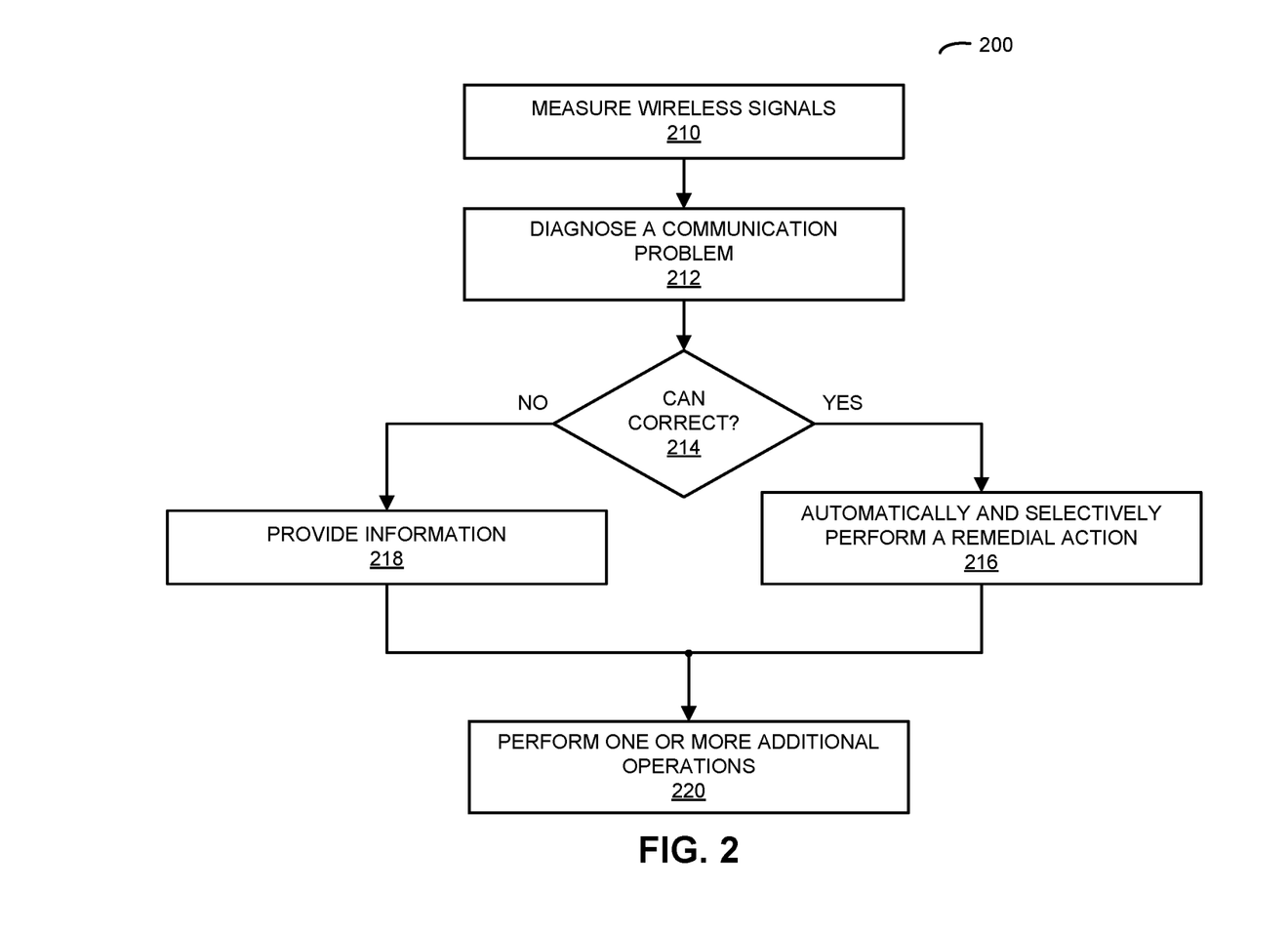
FIG. 2 is a flow diagram illustrating an example of a method for selectively performing a remedial action using a portable electronic device in FIG. 1 in accordance with an embodiment of the present disclosure.

We now describe embodiments of the method. FIG. 2 presents a flow diagram illustrating an example of a method 200 for selectively performing a remedial action, which may be performed by a portable electronic device, such as electronic device 110-1 in FIG. 1. During operation, the portable electronic device may measure wireless signals (operation 210) associated with communication with the second electronic device. For example, the wireless signals may be associated with communication of a packet or a frame to and/or from the second electronic device. Note that the wireless network may include a WLAN. This WLAN may be compatible with an IEEE 802.11 communication protocol.

Then, based at least in part on the measured wireless signals, the portable electronic device may diagnose a communication problem (operation 212), such as a communication problem associated with the second electronic device in a wireless network. In some embodiments, diagnosing the communication problem may include emulating a third electronic device and communicating with the wireless network. For example, during the emulating, the portable electronic device may execute an operating system of the third electronic device using a virtual machine.

Moreover, when the portable electronic device is able to correct the communication problem (operation 214), the portable electronic device may automatically and selectively perform the remedial action (operation 216) based at least in part on the communication problem, where the remedial action corrects the communication problem.

For example, when the communication problem includes a loss of a connection between the second electronic device and a controller of the second electronic device, the remedial action may include: establishing a connection or an association with a distressed SSID of the second electronic device; rebooting the second electronic device; and re-establishing the connection between the second electronic device and the controller. Alternatively, when the communication problem includes a mismatch in a communication protocol used by the second electronic device (such as Wi-Fi 6 vs. Wi-Fi 5), the remedial action may include changing one or more configuration parameters of the second electronic device (e.g., the portable electronic device may instruct the second electronic device to change the one or more configuration parameters or may request that a computer instruct the second electronic device to change the one or more configuration parameters). In some embodiments, the remedial action may include upgrading software in the second electronic device (e.g., the portable electronic device may upgrade the software in the second electronic device or may request that a computer upgrade the software in the second electronic device).

Otherwise (operation 214), the portable electronic device may provide information (operation 218) specifying the measured wireless signals and/or the communication problem addressed to the computer. This information may assist the computer (or an operator of the computer) in diagnosing and/or correcting the communication problem.

In some embodiments, the portable electronic device may optionally perform one or more additional operations (operation 220). For example, the portable electronic device may include: a drive unit configured to move the electronic device; and a sensor configured to provide sensor information about the environment that includes the electronic device. Then, during operation, the portable electronic device may access a map of the environment. Moreover, the portable electronic device may autonomously navigate in the environment based at least in part on the sensor information and the map. For example, the portable electronic device may navigate to within wireless range of the second electronic device when a potential communication problem associated with the second electronic device is reported or when routine maintenance is performed in the environment. Alternatively or additionally, the portable electronic device may receive navigation instructions associated with the second electronic device, where the navigation instructions specify a route to a location of the second electronic device. In some embodiments, the portable electronic device may automatically navigate to a recharging station in the environment, and then may recharge one or more batteries in the portable electronic device.

Note that the wireless signals may be measured continuously, periodically or as-needed. For example, the portable electronic device may periodically determine a map of radio-frequency performance in an environment by measuring the wireless signals.

Moreover, the portable electronic device may include a cellular telephone. When a potential communication problem occurs with the second electronic device, the portable electronic device may receive the program instructions associated with the computer, which are then executed by the processor. For example, the program instructions may be requested by a user of the portable electronic device (such as by activating a virtual icon in a user interface, which is selectively displayed on a touch-sensitive display on the portable electronic device when the communication problem occurs). Alternatively, when the communication problem occurs, the program instructions may be pushed to the portable electronic device (e.g., by the computer, the second electronic device or another instance of the second electronic device in the wireless network). Then, a user of the portable electronic device may be prompted to install and execute the program instructions (e.g., by activating a virtual icon in a user interface, which is selectively displayed on a touch-sensitive display on the portable electronic device when the communication problem occurs, such as when the portable electronic device has difficulty in connecting to or associating with the second electronic device or the wireless network).

In some embodiments of method 200, there may be additional or fewer operations. Furthermore, the order of the operations may be changed, and/or two or more operations may be combined into a single operation.

Figure 3:
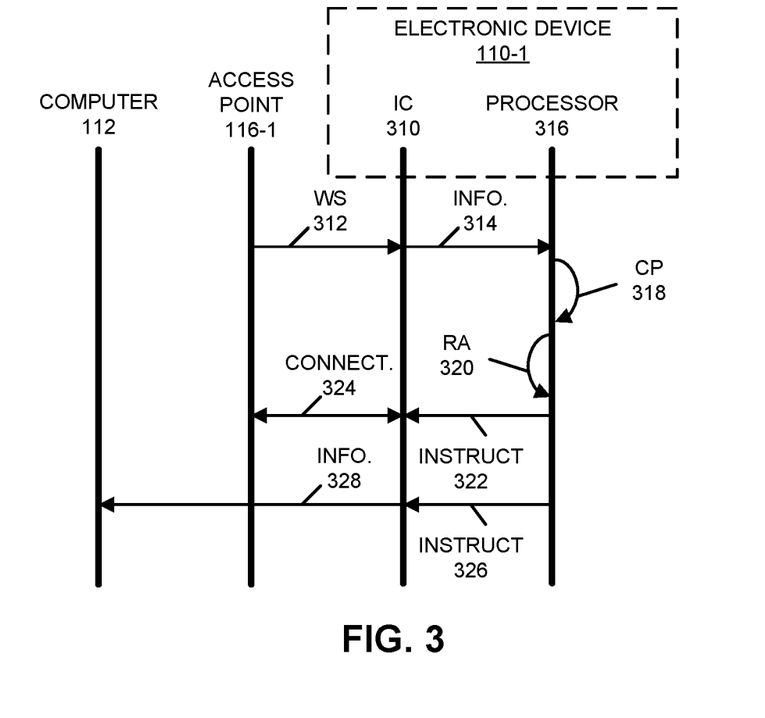
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among electronic device 110-1, access point 116-1 and computer 112. In FIG. 3, when a communication problem 318 occurs, electronic device 110-1 may be dispatched to or may be brought within wireless range of access point 116-1. Then, an interface circuit (IC) 310 in electronic device 110-1 may measure wireless signals (WS) 312 associated with communication with access point 116-1. Moreover, interface circuit 310 may provide information 314 specifying the measured wireless signals 312 to processor 316 in electronic device 110-1.

Then, based at least in part on the measured wireless signals 312, processor 316 may diagnose a communication problem (CP) 318, such as a communication problem associated with access point 116-1 in a wireless network (such as a WLAN).

Moreover, when electronic device 110-1 is able to correct the communication problem 318, electronic device 110-1 may automatically and selectively perform a remedial action (RA) 320 based at least in part on the communication problem 318, where the remedial action corrects the communication problem 318. For example, processor 316 may instruct 322 interface circuit 310 to establish a connection 324 with access point 116-1, and then instruct access point 116-1 to reboot. Alternatively or additionally, interface circuit 310 may, via connection 324, change one or more configuration parameters of access point 116-1 and/or may upgrade software in access point 116-1.

Otherwise, processor 316 may instruct 326 interface circuit 310 to provide information 328 to computer 112, where information 328 specifies the measured wireless signals 312 and/or the communication problem 318. This information may assist computer 112 (or an operator of computer 112) in diagnosing and/or correcting the communication problem 318.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

Figure 4:
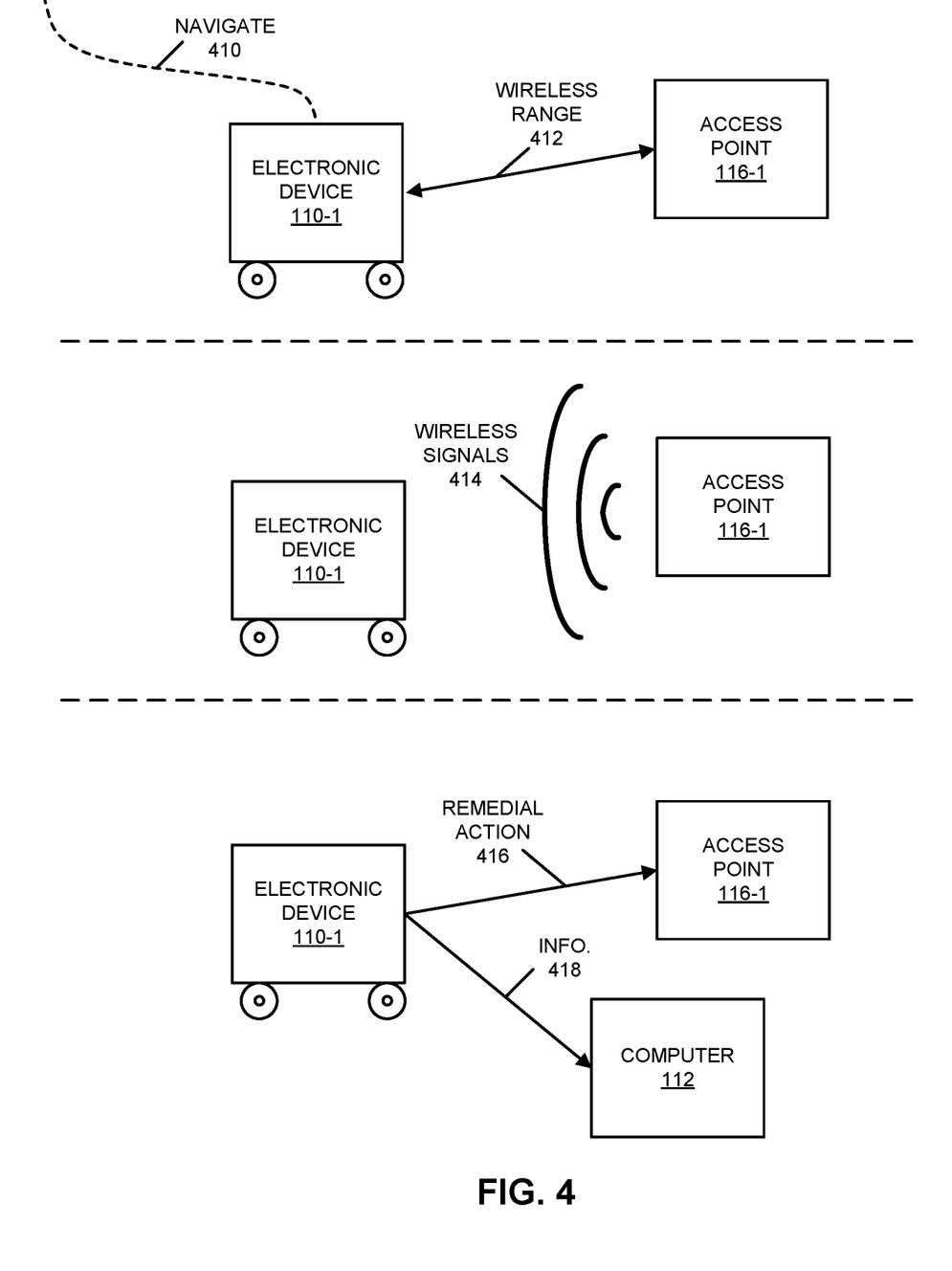
FIG. 4 is a drawing illustrating an example of maintaining a wireless network using a portable electronic device in FIG. 1 in accordance with an embodiment of the present disclosure.

FIG. 4 presents a drawing illustrating an example of maintaining a wireless network using a portable electronic device in accordance with an embodiment of the present disclosure. Notably, electronic device 110-1 may navigate 410 to within wireless range 412 of access point 116-1. Then, electronic device 110-1 may measure wireless signals 414 associated with communication with access point 110-1. Moreover, electronic device 110-1 may diagnose a communication problem, such as a communication problem associated with access point 116-1. Next, electronic device 110-1 may automatically and selectively perform a remedial action 416 (such as with access point 116-1) to correct the communication problem. Alternatively or additionally, electronic device 110-1 may provide information 418 specifying the measured wireless signals and/or the communication problem to computer 112.

In some embodiments, the communication techniques, a robotic assistant, drone (such as an aerial drone) or a machine (which is sometimes referred to as a 'portable electronic device') may augment the self-healing capability of a wireless network. This robotic assistant may be able to roam the coverage area of the wireless network and may be able to connect to a central analytics system (such as computer 112 in FIG. 1) to aid troubleshooting and self-healing. For example, the robotic assistant may travel to an area with a coverage or connectivity issue (which is sometimes referred to as a 'communication problem'). The communication techniques may address the problems by actually experiencing a potential connectivity or coverage problem by being in the same physical space at the location of the problem. The measurements performed by the robotic assistant may help a central analytics system (e.g., in computer 112) make better decisions and, thus, appropriate corrective actions.

The robotic assistant may be capable of performing operations, including: downloading or automatically determining a map or floor plan of its roamable area (such as being aware of physical obstacles that can hinder its motion); guiding itself back to a spot to recharge its power supply; running techniques for detecting a communication problem; receiving and upgrading its software; automatically find and/or connect to computer 112 (FIG. 1), such as via the wireless network or using out-of-band communication (such as using LTE instead of Wi-Fi); emulating an client in the wireless network by contacting computer 112 and downloading credentials for the client; performing wireless measurements or scans (e.g., like a sniffer); and/or have the ability to remotely connect a stranded access point using its distress SSID and perform operations to recover it.

In some embodiments, the robotic assistant may connect to computer 112, which may provide cloud-based analytics for the wireless network. Then, the robotic assistant may download a map of an environment (such as a room, a floor in a hotel, or a building) with the locations of access points in the wireless network. Then, the robotic assistant may autonomously traverse the environment while recording its location (such as based at least in part on one or more of: a local positioning system, a global positioning system, wireless signals associated with a WLAN, wireless signals associated with a wireless network, wireless signals associated with a cellular-telephone network, triangulation, trilateration, Lidar, radar, images acquired with an imaging sensor, etc.). In the process, the robotic assistant may determine pathways and/or develop an internal map of how to reach a given access point and how to cover its coverage area. (Thus, in some embodiments, the robotic assistant may generate a new map or update an existing map in the environment of the locations of access points in the wireless network.) When the analytics system provided by computer 112 spots an area with trouble (such as a communication problem), it may instruct the robotic assistant to physically move into that area, to perform a diagnostic operation and/or to send data about the area to computer 112. If needed, the robotic assistant may connect to the wireless network from the troubled area and/or or may sniff packet transaction to assess what may be wrong. Note that this approach may eliminate the need for multiple statically located pods scattered across the wireless network to implement this functionality.

Consequently, the communication techniques implemented by the robotic assistant may reduce the cost of these capabilities and may provide more uniform service or coverage in the wireless network by navigating to the trouble area. Moreover, the data gathered by the robotic assistant may allow the robotic assistant may and/or computer 112 to make better decisions as to what may be affecting coverage and/or how to address the communication problem(s).

For example, the communication techniques may be used to recover a hung access point even if it has lost connectivity to its local or remotely located controller by logging in via its recovery or distressed SSID and performing more trouble shooting. Moreover, by determining accurate maps of radio-frequency performance in the wireless network, the communication techniques may facilitate improved radio-frequency planning. Note that the maps may be obtained by the robotic assistant by roaming during off-hours (such as at night or once per week) on a regular basis or periodically, so that the maps are not adversely affected by the addition of new furniture or by changes in seating arrangement in an office or in space where the locations of radio-frequency barriers may be dynamic. Furthermore, while Wi-Fi has been used as an illustrative example, in general the communication techniques may be used with a wide variety of wireless network, such as the Citizens Broadband Radio Spectrum, a smallcell, an LTE data network, or a cellular-telephone network.

We now describe embodiments of an electronic device, which may perform at least some of the operations in the communication techniques. FIG. 5 presents a block diagram illustrating an example of an electronic device 500 in accordance with some embodiments, such as one of: base station 108, one of electronic devices 110, one of access points 116, one of radio nodes 118 or computer 112. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs, program modules or instructions may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a metal pad or a connector, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as directors or reflectors) and/or one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems, such as power subsystem 530 or another subsystem that is not shown in FIG. 5. Also, although separate subsystems are shown in FIG. 5, in some embodiments some or all of a given subsystem or component can be integrated into one or more of the other subsystems or component(s) in electronic device 500. For example, in some embodiments instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514 and/or of electronic device 500. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

Moreover, while the preceding embodiments illustrated the portable electronic device performing wireless measurements or monitoring, in other embodiments the portable electronic device may perform different or additional measurements or monitoring. For example, the portable electronic device may monitor inventory at different locations in a retail establishment, and may selectively order additional inventory as needed.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable electronic device, comprising:
an interface circuit configured to communicate with a second electronic device in a wireless network and a computer;
a processor; and
memory configured to store program instructions, wherein, in response to being executed by the processor, the program instructions cause the portable electronic device to perform operations comprising:
measure, at the interface circuit, wireless signals associated with communication with the second electronic device;
diagnose a communication problem based at least in part on the measured wireless signals;
in response to the portable electronic device being able to correct the communication problem, automatically and selectively perform a remedial action based at least in part on the communication problem, wherein the remedial action corrects the communication problem; and
in response to the portable electronic device not being able to correct the communication problem, providing, from the interface circuit and addressed to the computer, information specifying the measured wireless signals, the communication problem or both, wherein, in response to the communication problem comprising a loss of a connection between the second electronic device and a controller of the second electronic device, the remedial action comprises: establishing a connection or an association with a distressed service set identifier (SSID) of the second electronic device; rebooting the second electronic device; and re-establishing the connection between the second electronic device and the controller.

2. The portable electronic device of claim 1, wherein, in response to the communication problem comprising a mismatch in a communication protocol used by the second electronic device, the remedial action comprises changing one or more configuration parameters of the second electronic device.

3. The portable electronic device of claim 1, wherein the remedial action comprises upgrading software in the second electronic device.

4. The portable electronic device of claim 1, wherein the wireless network comprises a wireless local area network (WLAN) that is compatible with an IEEE 802.11 communication protocol.

5. The portable electronic device of claim 1, wherein diagnosing the communication problem comprises emulating a third electronic device and communicating with the wireless network.

6. The portable electronic device of claim 5, wherein, during the emulating, the portable electronic device executes, using a virtual machine, an operating system of the third electronic device.

7. The portable electronic device of claim 1, wherein the second electronic device comprises: an access point, an Evolved Node B (eNodeB), or a base station.

8. The portable electronic device of claim 1, wherein the wireless signals are measured continuously, periodically or as-needed.

9. The portable electronic device of claim 1, wherein the operations comprise periodically determining a map of radio-frequency performance in an environment by measuring the wireless signals.

10. The portable electronic device of claim 1, wherein the portable electronic device comprises: a drive unit configured to move the portable electronic device; and a sensor configured to provide sensor information about an environment that includes the portable electronic device; and
wherein the operations comprise:
accessing a map of the environment; and
autonomously navigating in the environment based at least in part on the sensor information and the map.

11. The portable electronic device of claim 10, wherein the portable electronic device navigates to within wireless range of the second electronic device in response to a potential communication problem associated with the second electronic device being reported or in response to routine maintenance being performed in the environment.

12. The portable electronic device of claim 10, wherein the operations comprise receiving navigation instructions associated with the second electronic device;
wherein the navigation instructions specify a route to a location of the second electronic device; and
wherein the portable electronic device autonomously navigates to within wireless range of the second electronic device based at least in part on the navigation instructions.

13. The portable electronic device of claim 10, wherein the operations comprise:
automatically navigating to a recharging station in the environment; and
rechanging one or more batteries in the portable electronic device.

14. The portable electronic device of claim 1, wherein the portable electronic device comprises a cellular telephone; and
wherein the operations comprise:
receiving the program instructions associated with the computer in response to a potential communication problem occurring with the second electronic device; and
executing the program instructions using the processor.

15. A non-transitory computer-readable storage medium for use in conjunction with a portable electronic device, the computer-readable storage medium storing program instructions that, in response to execution by the portable electronic device, cause the portable electronic device to perform operations comprising:
measuring, at an interface circuit in the portable electronic device, wireless signals associated with communication with a second electronic device in a wireless network;
diagnosing a communication problem based at least in part on the measured wireless signals;
when the portable electronic device is able to correct the communication problem, automatically and selectively performing a remedial action based at least in part on the communication problem, wherein the remedial action corrects the communication problem; and
in response to the portable electronic device not being able to correct the communication problem, providing, from the interface circuit and addressed to a computer, information specifying the measured wireless signals, the communication problem or both, wherein, in response to the communication problem comprising a loss of a connection between the second electronic device and a controller of the second electronic device, the remedial action comprises: establishing a connection or an association with a distressed service set identifier (SSID) of the second electronic device; rebooting the second electronic device; and re-establishing the connection between the second electronic device and the controller.

16. The non-transitory computer-readable storage medium of claim 15, wherein, the remedial action comprises changing one or more configuration parameters of the second electronic device, or upgrading software in the second electronic device.

17. The non-transitory computer-readable storage medium of claim 15, wherein the operations comprise:
accessing a map of an environment; and
autonomously navigating the portable electronic device in the environment based at least in part on sensor information acquired by the portable electronic device and the map, wherein the portable electronic device navigates to within wireless range of the second electronic device in response to a potential communication problem associated with the second electronic device being reported or in response to routine maintenance being performed in the environment.

18. A method for selectively performing a remedial action, comprising:
by a portable electronic device:
measuring, at an interface circuit in the portable electronic device, wireless signals associated with communication with a second electronic device in a wireless network;
diagnosing a communication problem based at least in part on the measured wireless signals;

in response to the portable electronic device being able to correct the communication problem, automatically and selectively performing the remedial action based at least in part on the communication problem, wherein the remedial action corrects the communication problem; and in response to the portable electronic device not being able to correct the communication problem, providing, from the interface circuit and addressed to a computer, information specifying the measured wireless signals, the communication problem or both, wherein, in response to the communication problem comprising a loss of a connection between the second electronic device and a controller of the second electronic device, the remedial action comprises: establishing a connection or an association with a distressed service set identifier (SSID) of the second electronic device; rebooting the second electronic device; and re-establishing the connection between the second electronic device and the controller.

19. The method of claim 18, wherein, in response to the communication problem comprising a mismatch in a communication protocol used by the second electronic device, the remedial action comprises changing one or more configuration parameters of the second electronic device.

20. The method of claim 18, wherein the method comprises:

accessing a map of an environment; and autonomously navigating in the environment based at least in part on the map and sensor information about the environment that includes the portable electronic device.

* * * * *